United States Patent
Akers et al.

(10) Patent No.: US 10,013,389 B2
(45) Date of Patent: Jul. 3, 2018

(54) AUTOMATIC CASCADED ADDRESS SELECTION

(71) Applicant: Avago Technologies General IP (Singapore) Pte. Ltd., Singapore (SG)

(72) Inventors: Kevin Akers, Atlanta, GA (US); Justin McCollum, Atlanta, GA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 457 days.

(21) Appl. No.: 14/735,098

(22) Filed: Jun. 9, 2015

(65) Prior Publication Data

US 2016/0364362 A1    Dec. 15, 2016

(51) Int. Cl.
*G06F 13/42* (2006.01)
*G06F 13/364* (2006.01)
*G06F 13/40* (2006.01)

(52) U.S. Cl.
CPC ........ *G06F 13/4291* (2013.01); *G06F 13/364* (2013.01); *G06F 13/404* (2013.01)

(58) Field of Classification Search
CPC ... G06F 13/364; G06F 13/404; G06F 13/4291
See application file for complete search history.

(56) References Cited

U.S. PATENT DOCUMENTS

| | | | |
|---|---|---|---|
| 6,377,650 B1 | 4/2002 | Deng et al. | |
| 6,629,172 B1 * | 9/2003 | Andersson | G06F 13/4291 710/104 |
| 7,895,377 B2 | 2/2011 | Cedar et al. | |
| 8,631,179 B1 * | 1/2014 | Faulds | G06F 13/364 710/110 |
| 2006/0123168 A1 * | 6/2006 | Lang | G06F 13/4256 710/110 |
| 2006/0282719 A1 | 12/2006 | Damodaran | |
| 2010/0185784 A1 * | 7/2010 | De Nie | G05B 19/0423 710/9 |
| 2012/0243559 A1 * | 9/2012 | Pan | H04J 3/1605 370/503 |
| 2013/0204962 A1 | 8/2013 | Estevez et al. | |
| 2014/0133242 A1 | 5/2014 | Oh et al. | |
| 2015/0046746 A1 | 2/2015 | Messer | |

FOREIGN PATENT DOCUMENTS

JP          5579448 B2     5/2010

OTHER PUBLICATIONS

"A Basic Serial Communication Interface", Maxim Integrated, Dec. 2006, http://pdfserv.maximintegrated.com/en/an/AN3947.pdf.

* cited by examiner

*Primary Examiner* — Nimesh G Patel
(74) *Attorney, Agent, or Firm* — Sheridan Ross P.C.

(57) ABSTRACT

An apparatus for addressing electronic circuits includes a host device comprising an address output, and a number of addressable electronic circuits, each comprising an address input, an address selection input and an address selection output, wherein the addressable electronic circuits are connected serially with each pair of the serially connected addressable electronic circuits connected by the address selection input and the address selection output.

20 Claims, 3 Drawing Sheets

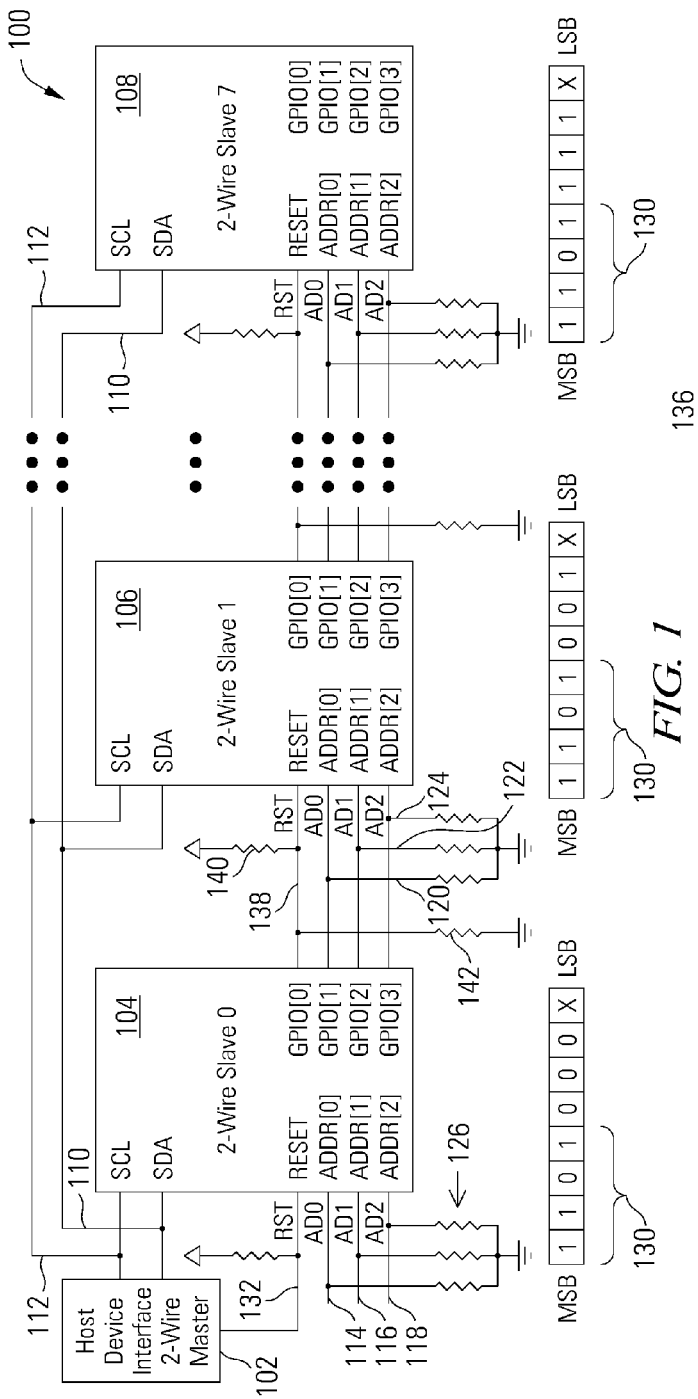
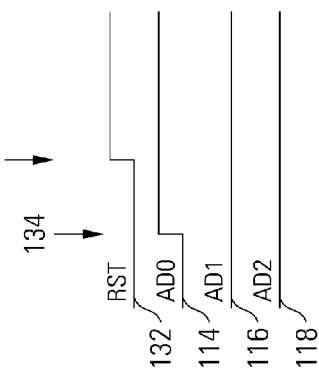
FIG. 1
FIG. 2

AUTOMATIC CASCADED ADDRESS SELECTION

FIELD OF THE INVENTION

Various embodiments of the present invention provide systems and methods for configuring circuits and devices on an electronic bus with unique addresses.

BACKGROUND

Electronic circuits can be connected by buses, transmission paths on which data is transmitted to and from the circuits. Multiple circuits can be connected to the same bus, and data can be communicated via the bus to a particular one of the circuits by transmitting the address of the circuit on the bus along with the data. Each of the circuits is configured with an address, typically each having a unique address, enabling each circuit to receive data addressed to it. When an address is transmitted on the bus, each circuit connected to the bus can compare the transmitted address with its own unique address to determine whether the data transmitted with the address is directed to it. Circuits on a bus can each be configured with a unique address by hardwiring the address, so that each of the circuits is unique. However, this requires customization of each individual circuit, complicating manufacturing and fabrication. Circuits on a bus can also be configured with unique addresses by providing each with a switch such as a dual in-line package (DIP) switch that can each be manually set to unique addresses. However, this requires that a system integrator or builder manually configure each of the switches, increasing labor requirements and the risk of errors.

BRIEF SUMMARY

Some embodiments of the present invention provide an apparatus for addressing electronic circuits including a host device comprising an address output, and a number of addressable electronic circuits, each comprising an address input, an address selection input and an address selection output, wherein the addressable electronic circuits are connected serially with each pair of the serially connected addressable electronic circuits connected by the address selection input and the address selection output.

The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components.

FIG. 1 depicts a schematic diagram of a host device with a serial connection to a number of slave devices with automatic cascaded address selection using digital address transmission in accordance with some embodiments of the present invention;

FIG. 2 depicts a timing diagram illustrating address selection in one of the slave devices of FIG. 1 in accordance with some embodiments of the present invention;

DETAILED DESCRIPTION OF THE INVENTION

Figures 3, 4:
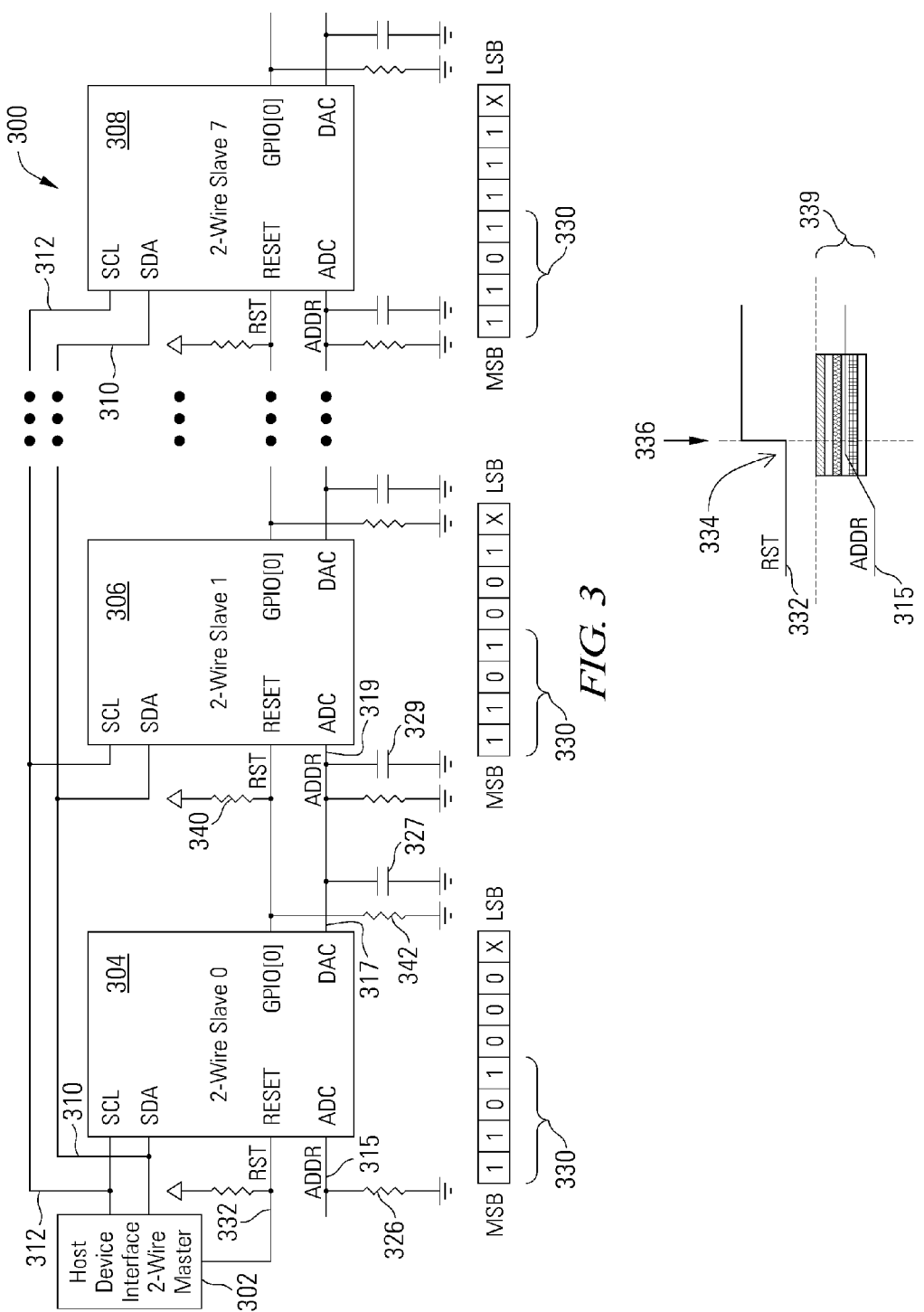
FIG. 3 depicts a schematic diagram of a host device with a serial connection to a number of slave devices with automatic cascaded address selection using analog address transmission in accordance with some embodiments of the present invention.
FIG. 4 depicts a timing diagram illustrating address selection in one of the slave devices of FIG. 3 in accordance with some embodiments of the present invention.

Various embodiments of the present invention provide systems and methods for automatic cascaded address selection. The systems and methods for automatic cascaded address selection can be used to automatically assign addresses to electronic circuits or devices, for example to identify the circuits or devices on a bus. In some embodiments, each automatically generated address is unique. The devices can be connected in any manner, such as, but not limited to, a serial bus (e.g., Inter-Integrated Circuit or I²C bus) or a parallel bus. The number of devices to be automatically assigned addresses is not limited to any particular number. The addresses are selected and assigned automatically without manual configuration, and the address-related circuits in the device can be identical for simple manufacturing and assembly.

Turning now to FIG. 1, a schematic diagram 100 depicts a host device 102 with a serial connection to a number of slave devices (e.g., 104, 106, 108) with automatic cascaded address selection using digital address transmission in accordance with some embodiments of the present invention. The slave devices (e.g., 104, 106, 108) can be configured for any purpose, such as, but not limited to, display devices, sensors, control devices, etc. The slave devices (e.g., 104, 106, 108) can be implemented in any suitable manner, such as printed circuit boards with one or more integrated circuits, as monolithic integrated circuits, flip chip integrated circuits, multichip module integrated circuits, as a system on a chip, etc. The host device 102 can be any device that transmits data to the slave devices (e.g., 104, 106, 108). For example, in some embodiments the slave devices (e.g., 104, 106, 108) comprise light emitting display boards, and the host device 102 comprises a controller that controls the slave devices (e.g., 104, 106, 108) to produce a desired pattern.

In the embodiment of FIG. 1, the host device 102 is connected to the slave devices (e.g., 104, 106, 108) by an I²C bus including a serial data line (SDA) 110 and a serial clock line (SCL) 112. The host device 102 and slave devices (e.g., 104, 106, 108) are connected to the serial data line 110 and the serial clock line 112 using open drain connections, enabling the serial data line 110 and serial clock line 112 to be pulled up to a high state by resistors (not shown). Any of the host device 102 and slave devices (e.g., 104, 106, 108) can then pull down the serial data line 110 and the serial clock line 112. The host device 102 waits until all of the slave devices (e.g., 104, 106, 108) have released the serial clock line 112 before attempting to communicate with any of the slave devices (e.g., 104, 106, 108). Once each of the slave devices (e.g., 104, 106, 108) has been configured with an address, the host device 102 can communicate with the slave devices (e.g., 104, 106, 108) in any suitable manner. For example, the host device 102 could transmit data to slave device 106 by transmitting start bits on the serial data line 110 (clocked by pulses on the serial clock line 112) to indicate the start of a message, followed by the address of slave device 106, the data being transmitted to slave device 106, and a stop bit to indicate the end of the message. Again, any connection type and message protocol can be used with automatic cascaded address selection. The host device 102 could read data from a slave device (e.g., 108) by transmitting a start bit, the address of slave device 108, a direction bit set to write, the address of the data to be read from slave device 108, another start bit and a direction bit set to read.

The automatic cascaded address selection configures each of the slave devices (e.g., 104, 106, 108) with a unique address to be used by the host device 102 when communicating with them. Each of the slave devices (e.g., 104, 106, 108) can have identical circuitry, precluding any need to customize each with a different address or to manually set each to a different address. Each slave device (e.g, 104) receives its address or is configured with an address on address inputs ADDR[0] 114, ADDR[1] 116, ADDR[2] 118, and outputs the address for the next slave device (e.g, 106) using outputs such as general purpose input/output pins GPIO[1] 120, GPIO[2] 122, GPIO[3] 124, which are connected to the address inputs (ADDR[0]-ADDR[2]) on the next slave device (e.g., 106). Each slave device (e.g., 104) generates a different address for the next slave device (e.g., 106) based on its own address in any suitable manner, such as, but not limited to, incrementing its own address by 1. Resistors (e.g., 126) can be provided to pull the address inputs (ADDR[0]-ADDR[2]) of each slave device (e.g., 104, 106, 108) to a default value or as needed based on the type of logic with which the address circuitry is implemented in the slave devices (e.g., 104, 106, 108). For example, resistors 126 pull the address inputs ADDR[0] 114, ADDR[1] 116, ADDR[2] 118 of slave device 104 down, setting the three address bits ADDR[0] 114, ADDR[1] 116, ADDR[2] 118 to 0. Slave device 104 thus has an address in which ADDR[2:0] is 0.

Slave device 104 increments this by 1, outputting 001 from output pins GPIO[1] 120, GPIO[2] 122, GPIO[3] 124, which are connected to the address inputs (ADDR[0]-ADDR[2]) on the next slave device 106. Slave device 106 thus has an address in which ADDR[2:0] is 1. In the embodiment of FIG. 1 in which the slave devices (e.g., 104, 106, 108) have three configurable address bits, the automatic cascaded address selection can provide up to eight slave devices with unique addresses (0 to 7). If, for example, slave device 108 is the eight slave device, the preceding slave device (not shown) will pull all three of its address inputs (ADDR[0]-ADDR[2]) to a high state, and slave device 108 will thus have an address in which ADDR[2:0] is 7.

The number of bits in each address is not limited to any particular number of bits, and not all address bits need to be configurable. In the embodiment of FIG. 1, the slave devices (e.g., 104, 106, 108) have four preconfigured, fixed value address bits 130, three configurable address bits and a don't care bit. An 8-bit 2-wire address register [7:0] of each slave device thus contains four bits [7:4] that are preconfigured, three bits [3:1] that are configured using automatic cascaded address selection by address inputs ADDR[2:0], and a don't care bit in the least significant bit position [0]. The fixed address bits 130 can be hardwired in the slave devices (e.g., 104, 106, 108) during fabrication or initial configuration or can be fixed in any other suitable manner. Fixed address bits 130 allow for groups of devices to be distinguished on the bus while reducing the number of I/O pins on each device.

Turning to FIG. 2, each slave device (e.g., 102) is configured with an address when a reset pin (e.g., 132) on the slave device is released. The values on its address inputs ADDR[0] 114, ADDR[1] 116, ADDR[2] 118 are set at a first point in time 134, and its reset pin 132 is pulled up at a later point in time 136, releasing the reset and causing the slave device 104 to use the address on its address inputs ADDR[0] 114, ADDR[1] 116, ADDR[2] 118. The slave device 104 can either latch in the address on its address inputs ADDR[0] 114, ADDR[1] 116, ADDR[2] 118 or can directly use the value on its address inputs ADDR[0] 114, ADDR[1] 116, ADDR[2] 118. In some embodiments, the rising edge of the RST signal on the reset pin causes a slave device to latch in the address. In some embodiments, the host device 102 initiates the automatic cascaded address selection process by releasing or pulling up the reset pin 132 of the first slave device 104 to release its reset. Of course, where the address inputs ADDR[0] 114, ADDR[1] 116, ADDR[2] 118 are pulled down to the initial address of 0 by resistors 126, the value of address inputs ADDR[0] 114, ADDR[1] 116, ADDR[2] 118 is set as soon as power has been applied to the circuit, and the reset can be released by the host device 102 at any point 136 after that. Additional pullup 140 and pulldown resistors 142 can be included as desired or as needed based on the type of logic with which the slave devices are implemented.

A general purpose output pin GPIO[0] 138 on the first slave device 104 is connected to the reset pin of the next slave device 106. The first slave device 104 holds the reset pin of the second slave device 106 down while generating and outputting the address for the second slave device. The first slave device 104 releases the reset of the second slave device 106 after the address provided to the second slave device 106 is stable, causing the second slave device 106 to latch in its address. The address selection process continues in cascaded fashion, with each slave device holding the next slave device in reset until it has configured the address lines of the next slave device, at which point it releases the reset pin of the next slave device so the next slave device can latch in its address.

Each slave device (e.g., 104, 106, 108) holds the serial clock line 112 down in a low state until it has been configured with an address. After the reset line for a slave device (e.g., 104) has been released, the slave device (e.g., 104) latches in its address and then released the serial clock line 112. At the beginning of the automatic cascaded address selection process, all of the slave devices (e.g., 104, 106, 108) will be holding down the serial clock line 112, and as each slave device is configured with an address, it releases the serial clock line 112 until all slave devices (e.g., 104, 106, 108) have been configured with unique addresses and all have released the serial clock line 112. The host device 102 can then begin to communicate with the slave devices (e.g., 104, 106, 108) using the serial data line 110 and serial clock line 112.

The number of slave devices (e.g., 104, 106, 108) included in the system is arbitrary, and none needs to know where it is in the address configuration line, whether it is first or last or how many slave devices are connected to the bus.

In the embodiment of FIG. 1, the serial clock line 112 being held low communicates to the host device 102 that the addresses of all the slave devices (e.g., 104, 106, 108) have been configured. In other embodiments, the completion of address assignments can be communicated in any suitable manner, for example using another shared status line to which all the slave devices (e.g., 104, 106, 108) are connected by open drain connections.

In another embodiment, a number of electronic devices can be connected in a peer-to-peer network without a host, with a unique address assigned to each of the devices using the automatic cascaded address selection disclosed herein.

Each slave device can generate the address for the subsequent device in any suitable manner, such as, but not limited to, adding 1 to its own address. Slave devices can, for example, derive the address for the next slave device from based on their own address in any other suitable manner, for example by incrementing or decrementing their own address by 1 or any other value, or by deriving the subsequent address in another manner. The address for the next slave device can be calculated using hardware circuits, program code, or a combination of the two. Based upon the disclosure provided herein, one of ordinary skill in the art will recognize a variety of techniques for generating an address for the next device that can be used in relation to different embodiments of the present invention.

Each device connected to the bus or interconnected in another manner can have a unique address assigned by automatic cascaded address selection, or multiple devices can share addresses if desired. For example, for pairs of devices to each share an address, the address output from one device on the bus can be connected to the address inputs of a pair of devices, configuring them both with the same address. One of the pair of devices can then be used to generate and provide the next address for a subsequent device or pair of devices.

Turning now to FIG. 3, a schematic diagram 300 depicts a host device 302 with a serial connection to a number of slave devices (e.g., 304, 306, 308) with automatic cascaded address selection using analog address transmission in accordance with some embodiments of the present invention. In this embodiment, addresses are communicated between slave devices (e.g., 304, 306, 308) using analog voltages, generated and interpreted using analog to digital converters (ADCs) and digital to analog converters (DACs), respectively, in the slave devices. In this embodiment, each unique address is associated with a different analog voltage range.

The slave devices (e.g., 304, 306, 308) can be configured for any purpose, such as, but not limited to, display devices, sensors, control devices, etc. The slave devices (e.g., 304, 306, 308) can be implemented in any suitable manner, such as printed circuit boards with one or more integrated circuits, as monolithic integrated circuits, flip chip integrated circuits, multichip module integrated circuits, as a system on a chip, etc. The host device 302 can be any device that transmits data to the slave devices (e.g., 304, 306, 308). For example, in some embodiments the slave devices (e.g., 304, 306, 308) comprise light emitting display boards, and the host device 302 comprises a controller that controls the slave devices (e.g., 304, 306, 308) to produce a desired pattern.

In the embodiment of FIG. 3, the host device 302 is connected to the slave devices (e.g., 304, 306, 308) by an I²C bus including a serial data line (SDA) 310 and a serial clock line (SCL) 312. The host device 302 and slave devices (e.g., 304, 306, 308) are connected to the serial data line 310 and the serial clock line 312 using open drain connections, enabling the serial data line 310 and serial clock line 312 to be pulled up to a high state by resistors (not shown). Any of the host device 302 and slave devices (e.g., 304, 306, 308) can then pull down the serial data line 310 and the serial clock line 312. The host device 302 waits until all of the slave devices (e.g., 304, 306, 308) have released the serial clock line 312 before attempting to communicate with any of the slave devices (e.g., 304, 306, 308). Once each of the slave devices (e.g., 304, 306, 308) has been configured with an address, the host device 302 can communicate with the slave devices (e.g., 304, 306, 308) in any suitable manner. For example, the host device 302 could transmit data to slave device 306 by transmitting start bits on the serial data line 310 (clocked by pulses on the serial clock line 312) to indicate the start of a message, followed by the address of slave device 306, the data being transmitted to slave device 306, and a stop bit to indicate the end of the message. The host device 302 could read data from a slave device (e.g., 308) by transmitting a start bit, the address of slave device 308, a direction bit set to write, the address of the data to be read from slave device 308, another start bit and a direction bit set to read. Again, any connection type and message protocol can be used with automatic cascaded address selection.

The automatic cascaded address selection configures each of the slave devices (e.g., 304, 306, 308) with a unique address to be used by the host device 302 when communicating with them. Each of the slave devices (e.g., 304, 306, 308) can have identical circuitry, precluding any need to customize each with a different address or to manually set each to a different address. Each slave device (e.g, 304) receives its address or is configured with an address on an analog to digital converter input (e.g., 315), and outputs the address for the next slave device (e.g, 306) using a digital to analog converter output (e.g., 317), which is connected to the analog to digital converter input (e.g., 319) on the next slave device (e.g., 306). The slave devices (e.g., 304, 306, 308) read the analog voltage at their analog to digital converter address input and compare the voltage with predetermined voltage ranges to identify the address bits specified by the analog voltage.

Each slave device (e.g., 304) generates a different address for the next slave device (e.g., 306) based on its own address in any suitable manner, such as, but not limited to, incrementing its own address by 3. Each slave device (e.g., 304) then converts the address for the next slave device (e.g., 306) to an analog voltage using its digital to analog converter, so the next slave device (e.g., 306) can read and interpret the analog voltage to identify its unique address.

A resistor (e.g., 326) can be provided to pull the address input 315 to a default value. For example, resistor 326 pulls the address input 315 down into the analog voltage range of the first address, which is interpreted by the first slave device 304 to set the three address bits ADDR[2:0] to 0. Capacitors 327, 329 can also be provided as needed at analog to digital converter inputs and digital to analog converter outputs to provide current sink paths or for other reasons.

Slave device 304 increments this by 1, configuring its digital to analog converter with an input value of 001 and outputting the corresponding analog voltage at output 317, which is connected to the analog to digital converter address input 319 on the next slave device 306. Slave device 306 converts this analog voltage to a digital value which is interpreted to set ADDR[2:0] to 1. In the embodiment of Fig. the analog voltages generated and interpreted by analog to digital converters and digital to analog converters in the slave devices (e.g., 304, 306, 308) are divided into eight voltage ranges, corresponding to eight unique addresses represented by three configurable address bits. The automatic cascaded address selection in this embodiment can thus provide up to eight slave devices with unique addresses (0 to 7). If, for example, slave device 308 is the eight slave device, the preceding slave device (not shown) will output an analog voltage corresponding to the highest address voltage range, and slave device 308 will thus have an address in which ADDR[2:0] is 7.

The number of bits in each address is not limited to any particular number of bits, and not all address bits need to be configurable. In the embodiment of FIG. 3, the slave devices (e.g., 304, 306, 308) have four preconfigured, fixed value address bits 330, three configurable address bits and a don't care bit. An 8-bit 2-wire address register [7:0] of each slave device thus contains four bits [7:4] that are preconfigured, three bits [3:1] that are configured using automatic cascaded address selection by address inputs ADDR[2:0] that are represented by different analog voltage ranges, and a don't care bit in the least significant bit position [0]. The fixed address bits 330 can be hardwired in the slave devices (e.g., 304, 306, 308) during fabrication or initial configuration or can be fixed in any other suitable manner. Fixed address bits 330 allow for groups of devices to be distinguished on the bus while reducing the number of I/O pins on each device.

Turning to FIG. 4, each slave device (e.g., 302) is configured with an address when a reset pin (e.g., 332) on the slave device is released. The analog voltage to the analog to digital converter address input is set at a first point in time 334, and its reset pin 332 is pulled up at a later point in time 336 after the analog voltage has settled to the desired value within the range of voltages 339. Releasing the reset causes the slave device 304 to sample the analog voltage and to interpret the resulting digital value to set its configurable address bits. In some embodiments, the host device 302 initiates the automatic cascaded address selection process by releasing or pulling up the reset pin 332 of the first slave device 304 to release its reset. Where analog to digital converter address input 315 is pulled down to the voltage range corresponding to an initial address of 0 by resistor 326, the value of analog to digital converter address input 315 is set as soon as power has been applied to the circuit and has settled, and the reset can be released by the host device 302 at any point 336 after that. Additional pullup 340 and pulldown resistors 342 can be included as desired or as needed based on the type of logic with which the slave devices are implemented.

A general purpose output pin GPIO[0] 338 on the first slave device 304 is connected to the reset pin of the next slave device 306. The first slave device 304 holds the reset pin of the second slave device 306 down while generating and outputting the address for the second slave device. The first slave device 304 releases the reset of the second slave device 306 after the address provided to the second slave device 306 is stable, causing the second slave device 306 to latch in its address. The address selection process continues in cascaded fashion, with each slave device holding the next slave device in reset until it has configured the address lines of the next slave device, at which point it releases the reset pin of the next slave device so the next slave device can latch in its address.

Each slave device (e.g., 304, 306, 308) holds the serial clock line 312 down in a low state until it has been configured with an address. After the reset line for a slave device (e.g., 304) has been released, the slave device (e.g., 304) latches in its address and then released the serial clock line 312. At the beginning of the automatic cascaded address selection process, all of the slave devices (e.g., 304, 306, 308) will be holding down the serial clock line 312, and as each slave device is configured with an address, it releases the serial clock line 312 until all slave devices (e.g., 304, 306, 308) have been configured with unique addresses and all have released the serial clock line 312. The host device 302 can then begin to communicate with the slave devices (e.g., 304, 306, 308) using the serial data line 310 and serial clock line 312.

Each slave device can generate the address for the subsequent device in any suitable manner. In some embodiments, the address for the subsequent device is generated by converting the incoming analog address voltage to a digital address using an analog to digital converter and a comparison circuit or comparison program code, adding 1 to the digital address using an adder circuit or program code, then generating the address for the subsequent slave device using a digital to analog converter. In some other embodiments, the address for the subsequent device is incremented by adding a DC bias or otherwise increasing the analog voltage at the input to one slave device and providing the increased analog voltage to the analog to digital converter input of the subsequent device. For example, the analog voltage at the input to one slave device can be provided both to the slave device and to a summer circuit which adds a DC bias, with the output of the summer circuit being connected to the analog to digital converter input of the next slave device.

Figure 5:
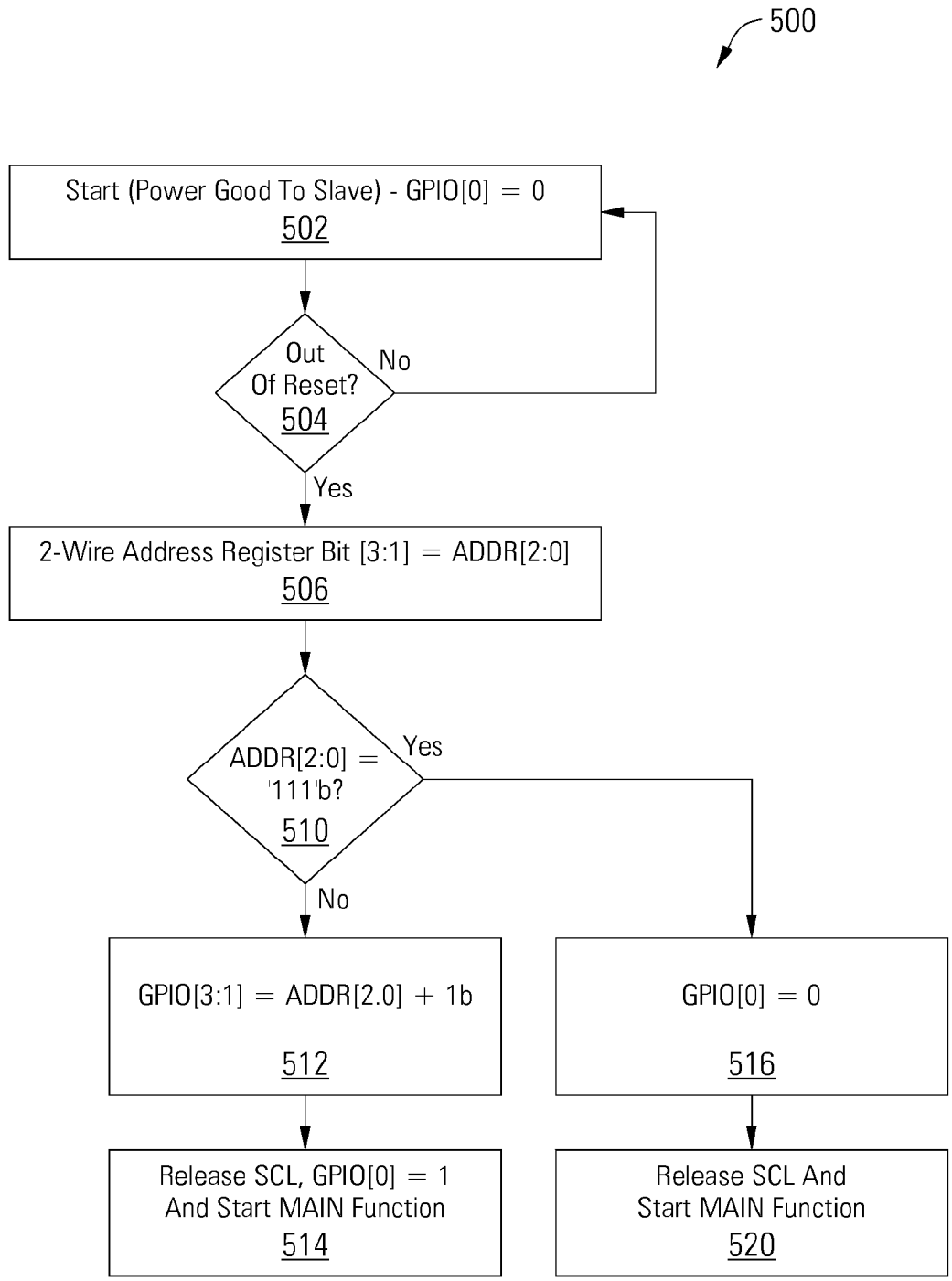
FIG. 5 depicts a flow diagram showing a method for automatic cascaded address selection in accordance with some embodiments of the present invention.

Turning now to FIG. 5, flow diagram 500 depicts a method for automatic cascaded address selection in accordance with some embodiments of the present invention, whereby a unique address is assigned to each of a number of slave devices. The method of flow diagram 500 is applicable to any number of slave devices.

Following flow diagram 500, the automatic cascaded address selection can begin when power has been applied to the circuit, with each slave device setting its GPIO[0] output to 0 to hold the next slave device in reset. (Block 502) Each slave device waits until its reset line has been released until it proceeds to read its address. (Block 504) When the reset line on a slave device has been released, it configures its address based on the value at its address input. (Block 506) In some embodiments using digital I/O to communicate addresses, each slave device configures bits [3:1] of its 2-wire address register based on its ADDR[2:0] inputs. If the ADDR[2:0] inputs are not '111'b, (Block 510), meaning that the slave device has not been set to the last available unique address, the slave device sets its GPIO[3:1] output to the value of its ADDR[2:0] inputs plus 1. (Block 512) The slave device then sets its GPIO[0] output to 1 to release the reset on the next slave device so it will latch in its address, and releases the clock serial line or other status line. (Block 514) The MAIN function can then be initiated in the slave device, allowing it to monitor the bus for communications directed to it.

If the ADDR[2:0] inputs of a slave device are '111'b when it comes out of reset (Block 510), meaning that the slave device has been set to the last available unique address, the slave device sets its GPIO[0] output to 0 (Block 516), releases the clock serial line or other status line, and initiates the MAIN function to monitor the bus for communications directed to it. (Block 520)

It should be noted that the various blocks discussed in the above description may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that some functions of the blocks, systems or circuits discussed herein may be implemented in either software or firmware in combination with hardware circuits.

In conclusion, the present invention provides novel apparatuses and methods for automatic cascaded address selection. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for addressing electronic circuits, comprising:
 a host device comprising an address output; and
 a plurality of addressable electronic circuits, each comprising an address input, an address selection input and an address selection output, wherein the plurality of addressable electronic circuits are connected serially with each pair of the serially connected addressable electronic circuits connected by the address selection input and the address selection output,
 wherein each of the addressable electronic circuits further comprises a reset input and a reset output, each reset output being connected to a reset input of a following one of the addressable electronic circuits,
 wherein each of the addressable electronic circuits releases a respective reset output to release the reset input of the following one of the addressable electronic circuits when the address selection input of the following one of the addressable electronic circuits is stable, and
 wherein, upon release of the reset input, the following one of the addressable electronic circuits sets a signal at the address selection input as a unique address.

2. The apparatus of claim 1, wherein each of the addressable electronic circuits is configured to output a different address value at its address selection output than it receives at its address selection input.

3. The apparatus of claim 1, wherein each of the addressable electronic circuits is configured to receive an address value at its address selection input, to increment the address value yielding an incremented address value and to output the incremented address value at its address selection output.

4. The apparatus of claim 1, wherein each of the addressable electronic circuits is configured to receive a unique address at its address selection input to be used to identify that one of the addressable electronic circuits.

5. The apparatus of claim 1, wherein each of the addressable electronic circuits is configured to receive an address value at its address selection input and to compare the address value with a received address value at the address input.

6. The apparatus of claim 1, wherein the address input on each of the addressable electronic circuits comprises a serial bus input.

7. The apparatus of claim 1, wherein the address input on each of the addressable electronic circuits comprises an I2C data input.

8. The apparatus of claim 1, wherein each of the addressable electronic circuits further comprises a clock port and wherein the host device further comprises a clock port, wherein the clock port on each of the addressable electronic circuits is connected to the host device clock port.

9. The apparatus of claim 8, wherein each of the addressable electronic circuits is configured to hold its clock port in an inactive state until it has been configured with a unique address at its address selection input.

10. The apparatus of claim 9, wherein the host device is configured to wait to use its address output until its clock is released from the inactive state by all of the addressable electronic circuits.

11. The apparatus of claim 1, wherein the address output of the host device comprises an I2C serial data line and wherein the clock port of the host device comprises an I2C serial clock line.

12. The apparatus of claim 1, wherein each of the addressable electronic circuits is configured to latch in a unique address at its address selection input when a corresponding reset input is released.

13. The apparatus of claim 1, wherein the address selection input of a first of the serially connected addressable electronic circuits is hardwired to a unique address.

14. The apparatus of claim 1, wherein the address selection inputs of all but a first of the serially connected addressable electronic circuits are configured to unique addresses by the address selection output of a preceding one of the addressable electronic circuits in a serial chain.

15. The apparatus of claim 1, wherein the address selection output of each of the addressable electronic circuits comprises a general purpose input/output port.

16. The apparatus of claim 1, wherein the address selection output of each of the addressable electronic circuits comprises a digital to analog converter output, and wherein the address selection input of each of the addressable electronic circuits comprises an analog to digital converter input, and wherein a unique address for each of the addressable electronic circuits is represented by a unique voltage level from the digital to analog converter outputs.

17. The apparatus of claim 1, wherein the address selection input of each of the addressable electronic circuits is configured to identify least significant bits of unique addresses and wherein each of the addressable electronic circuits is internally configured with a same set of most significant bits of the unique addresses.

18. A method for addressing electronic circuits, comprising:
 in a serial chain of a plurality of addressable electronic circuits, all but a first of the addressable electronic circuits receiving at least a portion of a different unique address from a preceding one of the addressable electronic circuits;
 each of the addressable electronic circuits releasing a reset signal to a following one of the addressable electronic circuits upon outputting one of the different unique addresses for the following one of the addressable electronic circuits, wherein the releasing the reset signal sets the following one of the addressable electronic circuits with the unique address received from the preceding one of the addressable electronic circuits;
 each of the addressable electronic circuits holding a status signal in an inactive state until it has received its unique address; and
 a host device transmitting an address and data to at least one of the addressable electronic circuits after all of the addressable electronic circuits have released the status signal from the inactive state.

19. The method of claim 18, wherein the status signal comprises a clock signal of a bus connected to the plurality of addressable electronic circuits.

20. A system for assigning unique addresses to each of a plurality of electronic circuits, comprising:
- means in each of the plurality of electronic circuits for reading one of the unique addresses at an address selection input when a reset input is released;
- means in each of the plurality of electronic circuits for calculating another of the unique addresses based on the unique address at the address selection input; and
- means in each of the plurality of electronic circuits for signaling when the unique address at the address selection input has been read,
- wherein the reset input is released based on a reset signal received from a reset output of a preceding one of the plurality of electronic circuits.

* * * * *